United States Patent [19]

Lawless

[11] Patent Number: 5,315,540
[45] Date of Patent: May 24, 1994

[54] METHOD AND HARDWARE FOR DIVIDING BINARY SIGNAL BY NON-BINARY INTEGER NUMBER

[75] Inventor: William F. Lawless, Red Hook, N.Y.

[73] Assignee: International Business Machines Corporation, Armonk, N.Y.

[21] Appl. No.: 931,623

[22] Filed: Aug. 18, 1992

[51] Int. Cl.$^5$ .............................................. G06F 7/52
[52] U.S. Cl. ..................................... 364/764; 364/761
[58] Field of Search .................................. 364/761, 764

[56] References Cited

U.S. PATENT DOCUMENTS

| | | | |
|---|---|---|---|
| 3,018,047 | 1/1962 | LaManna | 235/165 |
| 3,039,691 | 6/1962 | Fleming, Jr. et al. | 235/165 |
| 3,344,261 | 9/1967 | Hornung | 235/160 |
| 3,735,107 | 5/1973 | Bolt et al. | 364/763 |
| 4,074,254 | 2/1978 | Belser et al. | 340/324 |
| 4,231,021 | 10/1980 | Clark et al. | 340/347 |
| 4,688,186 | 8/1987 | Ferrell et al. | 364/764 |
| 4,748,442 | 5/1988 | Allaire | 340/750 |
| 4,985,848 | 1/1991 | Pfeiffer et al. | 364/518 |
| 4,989,173 | 1/1991 | Kaneda | 364/764 |
| 5,021,977 | 6/1991 | Sakaguchi | 364/521 |
| 5,140,544 | 8/1992 | Lin et al. | 364/761 |

OTHER PUBLICATIONS

"Determination of Remainder in Normal Clocking Cycle," Hornung, L. M.; IBM Technical Disclosure Bulletin, vol. 8, No. 11, Apr. 1966, pp. 1545–1547.

Primary Examiner—David H. Malzahn
Attorney, Agent, or Firm—Heslin & Rothenberg

[57] ABSTRACT

A binary signal hardware divider and method are described for a high performance computer graphics system. Each bit of an input binary signal to be divided by an integer number of a non-binary power is associated with a predetermined binary weight comprising the traditional binary weight for the bit divided by the integer number. The associated binary weights for each active bit are then summed to arrive at a resultant binary signal equal to the input binary signal divided by the integer number. A wire shifting technique for aligning selected ones of the binary weights without creation of any delay is also presented. Fast hardware divide within today's typical clock cycle is attained.

8 Claims, 3 Drawing Sheets

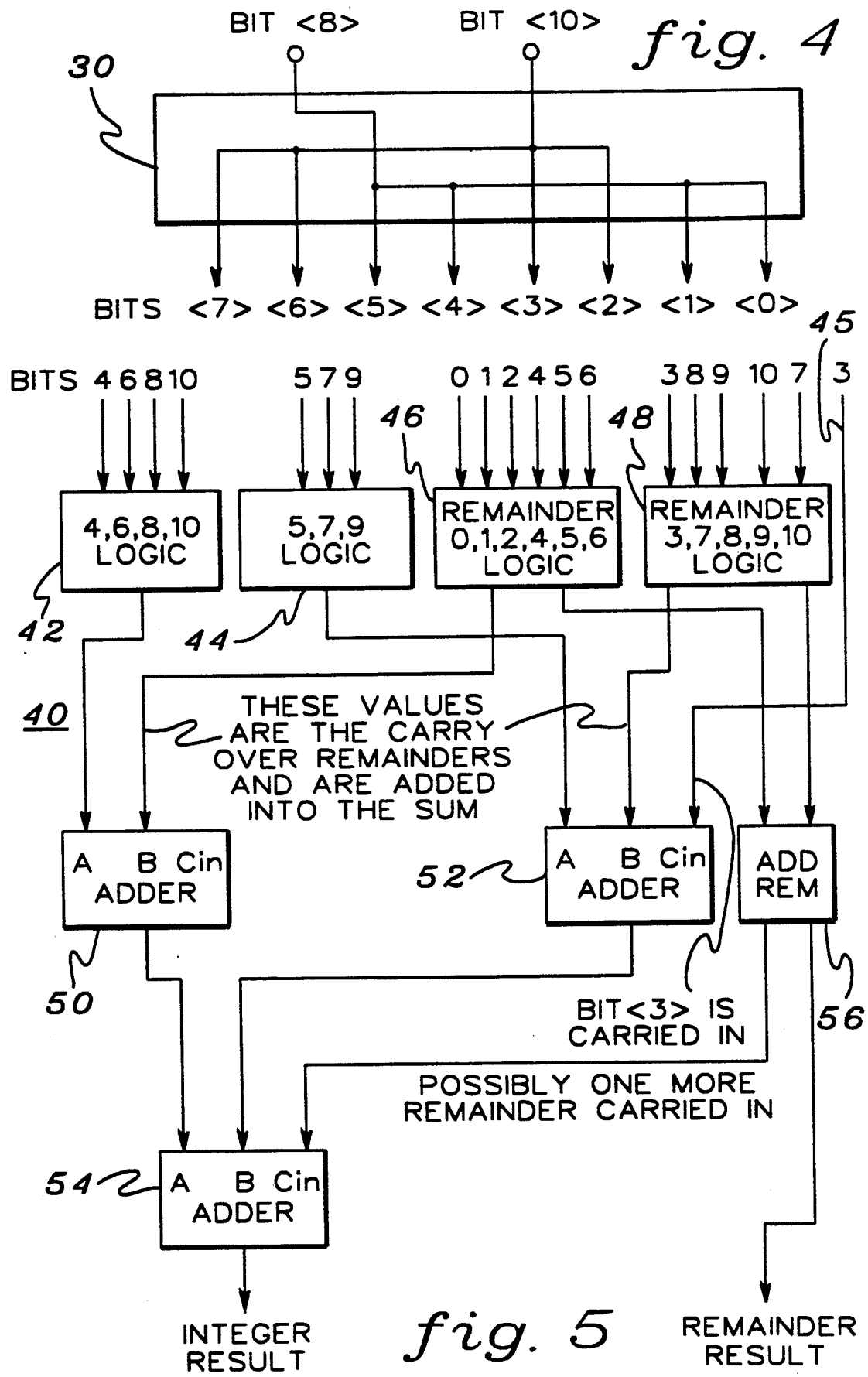

METHOD AND HARDWARE FOR DIVIDING BINARY SIGNAL BY NON-BINARY INTEGER NUMBER

TECHNICAL FIELD

This invention relates in general to computer processing of binary signals, and more particularly, to a high performance computer graphics system having a raster engine with enhanced hardware divide of binary signals for addressing within a single clock cycle a specific location in one of a multiple number of video RAM modules associated with the raster engine.

BACKGROUND ART

Computer graphics display systems, e.g., CAD/CAM graphics workstations, are widely used to generate and display two-dimensional images of three-dimensional objects for scientific, engineering, manufacturing and other applications. In such high performance computer graphics systems, digital representations of computer generated images conventionally reside in an array of video RAM, which collectively embody the system frame buffer. The rate at which the frame buffer can be updated/read is a critical parameter in the performance of the entire graphics system. One presently preferred graphics display consists of an array of 1280×1024 screen pixels. With such a display monitor, the common practice in industry is to employ five separate video RAMS in the frame buffer for storing variable information corresponding to each pixel of the screen.

By way of a common example, each of the five video RAMs may comprise a 512×512, eight bit deep RAM memory. Pixel locations are addressed in the raster engine as X,Y coordinate pairs which must be converted into a corresponding address to one of these five video RAMs of the associated frame buffer. The 1280×1024 pixel array of the display monitor is typically subdivided into a plurality of groupings or tiles each of which may, for example, be as basic as a sequence of five pixels in a row. Between each five pixel grouping, column address boundaries are defined. Assuming that there are five pixels in each row grouping of pixels, then the converted Y address for a given X,Y pixel location will be defined as X/5. Similarly, because each video RAM comprises a 512×512 array, two rows of screen pixels may be scanned simultaneously. Therefore, the particular row location is defined by Y/2. Finally, the video RAM module (i.e., module 0, 1, 2, 3 or 4) is identified as the remainder portion of the X address divide by five operation definitive of the column address crossing.

Division of a binary number by a binary power (1, 2, 4, 8, 16, 32, etc.) is easily obtained simply by an appropriate shift of the binary number of one bit (divide by two), two bits (divide by 4), three bits (divide by 8), etc. in the direction of less significance. However, division by five, or division by any integer number of a non-binary power, is significantly more complicated and time consuming.

An early attempt at a divide by five operation might have been implemented in software, requiring a significant amount of computing time to complete. Subsequent implementations have typically embodied one of three hardware approaches. A first technique is to use a register coupled with appropriate logic to process the X address in a number of iterations. The approach essentially comprises longhand division implemented in hardware and can be time consuming, typically requiring five clock cycles or more to complete a calculation. A second hardware approach is to implement the divide by five operation in combinatorial logic. For example, multiple levels of appropriately configured NAND gates can be used. However, this technique remains slow in terms of the delay involved to attain the necessary conversion. For example, a fifty nanosecond (50 ns) delay might be experienced in a typical system, which can be significant since today's fast processing systems are clocking at twenty nanoseconds with a fifty MHz clock. The third approach is a hybrid of the second technique wherein the combinatorial logic is pipelined with the addition of appropriate registers so that after a certain period of original latency, a non-binary power divide operation can be accomplished with every clock cycle. The problem with this approach, however, is the original latency period which obviously adds delay to the address conversion operation, as well as any associated tasks dependent thereon.

Thus, a genuine need exists in the computer processing field for a novel hardware approach to dividing a binary number by an integer number of a non-binary power, particularly for improved access time between a raster engine and its associated frame buffer in connection with the updating/reading of pixel variable information within a graphics display system.

DISCLOSURE OF THE INVENTION

Briefly summarized, the present invention provides in one aspect a computer processor method for dividing a given binary signal having a plurality of bits by an integer number of a non-binary power. Each of the signal's plurality of bits has a binary power of known weight associated therewith. The method includes the steps of: converting each '1' bit of the given binary signal into a corresponding binary weight signal comprising a binary representation of the binary power of known weight for the bit divided by the integer number; and summing the binary weight signals corresponding to the '1' bits of the given binary signal to produce a resultant binary signal. The resultant binary signal being a binary representation of the given binary signal divided by the integer number. Specific process enhancements to the summarized method are also described and claimed herein.

In another aspect, the present invention comprises a hardware divider for a raster engine of a graphics display system. The raster engine receives a given binary signal having a plurality of bits each of which has a known binary power weight. The hardware divider allows for fast dividing of the given binary signal by a predetermined integer number of a non-binary power. The divider includes combinatorial logic for converting each '1' bit in the given binary signal into a binary weight signal which comprises a binary representation of the binary power of known weight for the bit divided by the integer number. Each binary weight signal has an integer portion and a remainder portion. A summing means is associated with the combinatorial logic for summing the binary weight signals to derive a resultant binary signal having both an integer portion and a remainder portion. The resultant binary signal is a binary representation of the given binary signal divided by the predetermined integer number. As with the method, specific enhancements to the hardware divider are also described and claimed herein.

In each embodiment, the present invention embodies a recognition that a computerized arithmetic divide operation can be greatly simplified for binary signals by working with binary representations of divided weights for each digit of the binary signal. Thereafter, by aligning bits and doing wire shifts, the problem can be reduced to a few binary additions. More specifically, it will be recognized from the following discussion that a novel fast hardware divide by 5 technique for converting given address data is presented. The technique beneficially allows a raster engine to complete an X,Y division operation within a single clock cycle using today's fast operating frequencies, e.g., 50 MHz. The technique is flexible and allows for division of a binary signal by a non-binary power, integer number. Thus, as new systems evolve the techniques presented herein will continue to apply.

BRIEF DESCRIPTION OF THE DRAWINGS

These and other objects, advantages and features of the present invention will be more readily understood from the following detailed description of certain preferred embodiments of the present invention, when considered in conjunction with the accompanying drawings in which:

FIG. 4 schematically depicts a wire aligning approach pursuant to aspect of the present invention useful in combining binary weight signals of selected bits; and FIG. 5 schematically depicts for an 11 bit number one embodiment of an adding circuit for summing binary weight signals pursuant to the present invention.

BEST MODE FOR CARRYING OUT THE INVENTION

Figure 1:
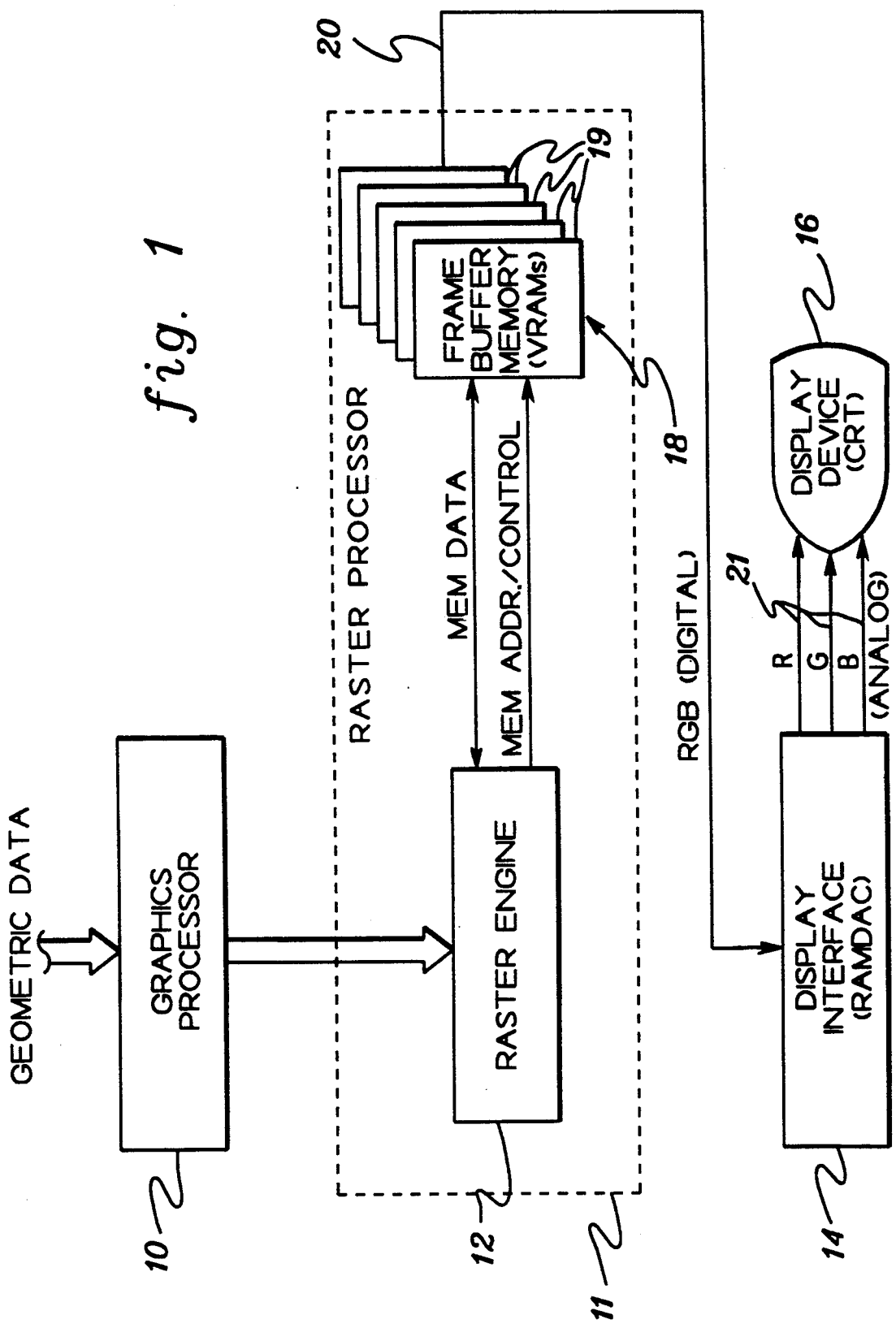
FIG. 1 is a block diagram illustration of a graphics system structure.

A graphics system is shown schematically in FIG. 1. A graphics processor 10 generates from received geometric data an X,Y and Z coordinate for each pixel of an object to be rendered. Along with the axis coordinates, a color, usually specified by red, green and blue components (RGB), is generated for the pixels required to describe the object to be rendered. The graphics processor may start at any X,Y,Z coordinate location and generate a sequence of adjacent pixels, typically proceeding in a vertical or horizontal direction. These pixel addresses are sent to a raster engine 12 within a raster processor 11. A display interface (or RAMDAC 14) accepts from processor 11 ordered pixel data in the form of digital color (RGB) data via line 20. (This data is provided by a frame buffer memory 18 from the serial output ports of multiple video RAM modules, discussed below, and is ordered to correspond to screen pixel locations.) The display interface operates to generate the analog signals RGB, on line 21, necessary to display the image on a screen device (or CRT) 16, along with the appropriate control signals. Although a CRT monitor device is shown, the techniques employed herein work equal well in combination with any two-dimensional display device, such as a plotter, printer, or other monitor type.

Again, associated with raster engine 12 is frame buffer memory 18 which includes a plurality of VRAMs 19. Memory address and control information is transferred on a first bus from engine 12 to memory 18, while memory data is transferred between the engine and the frame buffer memory on a second bus as shown. In today's graphics systems, a screen size of 1280×1024 pixels is very common. Assuming a 2 megabyte video memory module is employed, which is organized into 512×512×8 bits deep storage locations, then 5 VRAM modules is an ideal number to store pixel intensity data for a 1280×1024 screen size. Thus, raster engine 12 is typically provided with an X,Y pixel screen address data which must be divided by 5 to identify a particular column location within a specific module where the corresponding intensity information is stored. Although this arithmetic operation can be accomplished in a number ways (as described initially herein), with raster engines today running in the 30–50 MHz range most, if not all, known approaches are relatively slow, particularly if it is assumed that the goal is to accomplish an X,Y column address conversion within each clock cycle.

The present invention addresses this existing art difficiency. A specific embodiment of the invention is explained in detail below with reference to an 11 bit binary number. However, the appended claims should not be considered limited to the specific embodiments described, but rather the concepts presented are equally applicable to division of any N bit binary number by any integer number of a non-binary power (e.g., the number 3, 5 or 6). In each embodiment, however, the goal is to accomplish hardware division of a binary number using as few logic levels or gate delays as possible.

Figure 2:
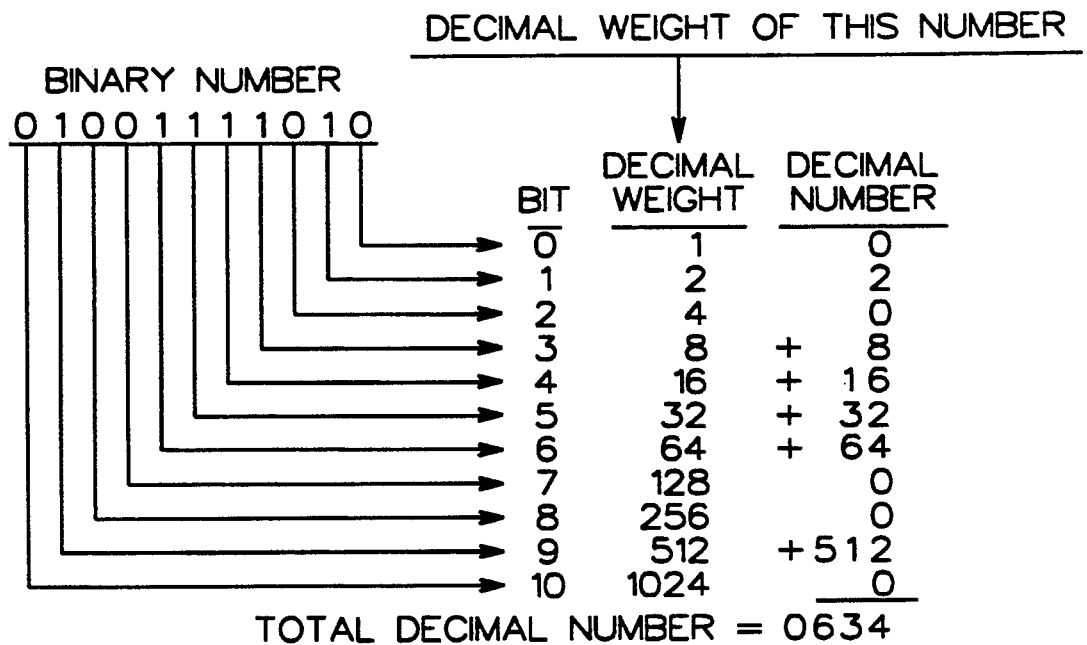
FIG. 2 is an example of a typical binary number to decimal number conversion.

FIG. 2 depicts an arbitrary 11 bit binary number (01001111010), which when converted to decimal number form (using standard binary power decimal weights) totals 634. This decimal number is attained by summing the corresponding decimal weight of each binary digit equal to "1". In a first aspect, the technique of the present invention is to divide each binary power decimal weight by the non-binary power integral number (e.g., the number 5) by which the binary signal (e.g., 01001111010) is to be divided. In addition to this concept, a unique grouping of the divided weights is presented to minimize the subsequent number of additions required. These concepts are described below.

Figure 3:
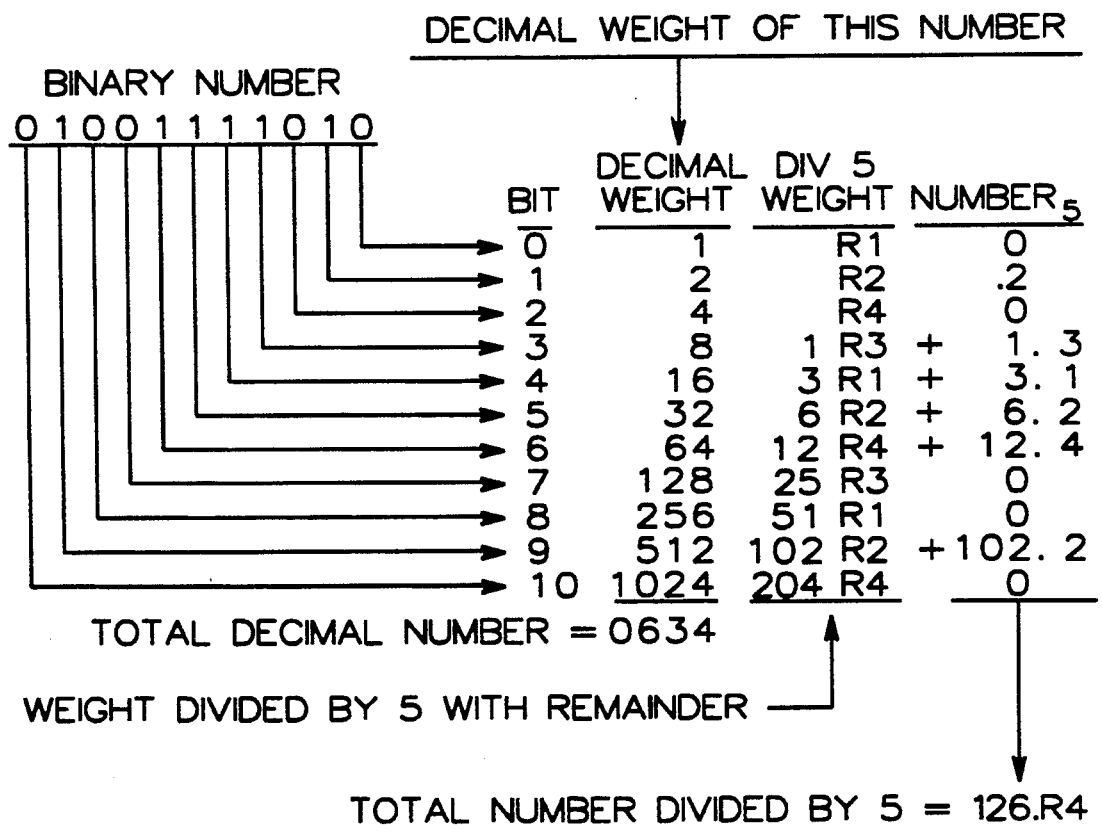
FIG. 3 is an example of a binary number to modulo 5 number conversion pursuant to the present invention.

Referring to FIG. 3, the binary number (01001111010) of FIG. 2 is shown, and in substitution of the standard binary power decimal weights, a binary divide by 5 weight is assigned to each binary digit. The corresponding divide by 5 weights are then summed to attain a total decimal number divided by 5 (Modulo 5). In this case, the applicable divide by 5 weights are summed to provide a result of 126.R4. Note that remainders are also added in Modulo 5, with each count of 5 resulting in a carry over to the integer portion of the result. Thus, for a pixel address of X,Y equal to (634,0) the column address would be 126 in VRAM module 4. Again, the remainder is important because it indicates which module of the frame buffer memory the pixel is written into or read from.

The benefit to initially converting each binary digit to its divide by 5 weight equivalent is that the number of bits in the binary signal under process is significantly reduced, which thereby enhances execution of the desired arithmetic operation. For example, the most significant binary bit, bit 10, has a decimal weight of 1024 and a divide by 5 weight of 204.R4, which in binary looks like 011001100.R100. (Each divide by 5 weight is translated into its corresponding binary number in Table 1 below.) Note that the binary signal under evaluation is reduced from an 11 bit binary number to an 8 bit binary number, which consequently reduces the amount of carries in the subsequent addition operations. (As described below, the integer and remainder portions of these binary numbers are handled separately.)

TABLE 1

| Div 5 Weight | Binary Div 5 Weight |
|---|---|
| R1 | 00000000.001 |
| R2 | 00000000.010 |
| R4 | 00000000.100 |
| 1 R3 | 00000001.011 |
| 3 R1 | 00000011.011 |
| 6 R2 | 00000110.010 |
| 12 R4 | 00001100.100 |
| 25 R3 | 00011001.011 |
| 51 R1 | 00110011.001 |
| 102 R2 | 01100110.010 |
| 204 R4 | 11001100.100 |

An important observation to be made from the binary weight representations in Table 1 is that the weight of bit 9 is half the weight of bit 10, the weight of bit 8 is half the weight of bit 9, the weight of bit 7 is half the weight of bit 8, etc. This relationship is true both for the divide by 5 weights and for their binary weight equivalents. Dividing a binary number by two is simply a shift of the bits to the right one binary digit, as the bits are seen moving from the binary weight representation for bit 10 to the binary weight number for bit 9, to the binary weight number for bit 8, etc. (Again, the remainders will be handled separately, but note that the remainders also follow a similar pattern.)

In another aspect of the present invention, it is recognized that the integer portion of the binary weights for certain bits can be added simply by aligning wires. By way of example, Tables 2 & 3 set forth the integer portion of the binary weights and the various signal possibilities for bit positions <8> and <10> of an assumed 11 digit binary signal. Note that there is no overlapping of binary digit high signals (i.e., "1's") when both bits are "1".

TABLE 2

| Bit | Decimal Weight | Div 5 Weight | Binary Div 5 Weight |
|---|---|---|---|
| 8 | 256 | 51 R1 | 000110011 |
| 10 | 1024 | 204 R4 | 011001100 |

TABLE 3

| Bit <8> | Bit <10> | Binary Quotient |
|---|---|---|
| 0 | 0 | 00000000 |
| 0 | 1 | 11001100 |
| 1 | 0 | 00110011 |
| 1 | 1 | 11111111 |

By way of example, FIG. 4 depicts a wiring block 30 wherein bits <8> & <10> are hard wired with the output result comprising the 8 binary digits (<0>-<7>) of the integer portion of the divide by 5 binary weight representation. Essentially, these bits are combined simply by aligning the wires. No gates are used and obviously no delay is created. Similarly, bits <5> & <7> can be aligned, as can bits <4> & <6>, without the need for gates or other forms of delay. Tables 4 & 5 set forth an example for the integer portions of the binary weights for bits <5> & <7>, while Tables 6 & 7 depict the corresponding information for bits <4> & <6> of the sample 11 digit binary signal.

TABLE 4

| Bit | Decimal Weight | Div 5 Weight | Binary Div 5 Weight |
|---|---|---|---|
| 5 | 32 | 6 R2 | 000000110 |
| 7 | 128 | 25 R3 | 000011001 |

TABLE 5

| Bit <5> | Bit <7> | Binary Quotient |
|---|---|---|
| 0 | 0 | 00000000 |
| 0 | 1 | 00011001 |
| 1 | 0 | 00000110 |
| 1 | 1 | 00011111 |

TABLE 6

| Bit | Decimal Weight | Div 5 Weight | Binary Div 5 Weight |
|---|---|---|---|
| 4 | 16 | 3 R1 | 000000011 |
| 6 | 64 | 12 R4 | 000001100 |

TABLE 7

| Bit <4> | Bit <6> | Binary Quotient |
|---|---|---|
| 0 | 0 | 00000000 |
| 0 | 1 | 00001100 |
| 1 | 0 | 00000011 |
| 1 | 1 | 00001111 |

Note that the selection of bits for aligning is somewhat arbitrary in that various different binary weight combinations are possible without requiring a carry over operation. For example, bit 3 with a binary weight (integer portion) of 00000001 could be combined with the binary weight for bit <5> or with bit <9>. However, maximum benefit is derived by combining binary weights for the most significant bits, e.g., 9 & 7 or bit 7 & 5) because of the greater number of carries which would be required for an arithmetic addition of these binary weights. Essentially, any bits could be so aligned provided that when the bits are active, there is no overlapping of "1" digits in the adjusted binary weight representations for the bits. In this example, it is arbitrarily assumed that bits <3> & <9> are not combined with other bits using this aligning technique.

Note, however, that no logic is used (and therefore no gate levels or delays are experienced) to combine bits <10> & <8> (binary quotient <10,8>), bits <7> & <5> (binary quotient <7,5>), and bits <6> & <4> (binary quotient <6,4>). The remaining additions to be completed for the integer portion are:

| |
|---|
| Binary Weight <9> |
| + Binary Quotient <10,8> |
| + Binary Quotient <7,5> |
| + Binary Quotient <6,4> |
| + Binary Weight <3> |

Before describing a hardware embodiment for completing this arithmetic function, the remainder portions of the binary weights are discussed.

The remainders are grouped using the same concept set forth above in connection with the integer portion of the binary weights. Specifically, those bits having mutually exclusive binary weight remainders can be combined. By way of example, Table 8 combines binary weight remainders for bits <0>,<1>,<2> (binary R.quotient <0,1,2>), bits <4>,<5>,<6> (binary R. quotient <4,5,6>), and bits <8>,<9>,<10> (binary R.quotient <8,9,10>). Again, all of these combinations are attained simply by aligning the bits. Also, the specific combination of binary weight remainders is somewhat arbitrary, as explained above in connection with the integer portions of the binary weights.

TABLE 8

| Bit | Div 5 Remainder Weights | Binary Div 5 Remainder Weight |
|-----|------------------------|-------------------------------|
| 0   | R1                     | .001                          |
| 1   | R2                     | .010                          |
| 2   | R4                     | .100                          |
| 4   | R1                     | .001                          |
| 5   | R2                     | .010                          |
| 6   | R4                     | .100                          |
| 8   | R1                     | .001                          |
| 9   | R2                     | .010                          |
| 10  | R4                     | .100                          |
| 3   | R3                     | .011                          |
| 7   | R3                     | .011                          |

Bit <3> adds a binary '011' (binary R.weight <3>) to the result. Also, bit <7> adds a binary '011' (binary R.weight <7>) to the result. Thus, the remaining additions to be completed for the remainder are:

|   |
|---|
| Binary R. Quotient <0,1,2> |
| + Binary R. Quotient <4,5,6> |
| + Binary R. Quotient <8,9,10> |
| + Binary R. Weight <3> |

Summarizing the above, no logic is used thus far and the divide by 5 problem is broken down into five addition problems for the integer portion and five addition problems for the remainder portion. These integer and remainder additions can be accomplished by one skilled in the art using any number of different hardware implementations. FIG. 5 depicts one preferred implementation.

The depicted hardware circuit, generally denoted 40, receives as input bit <0> through bit <10>. The binary quotients <4,6> and <8,10> (i.e., integer portions) are added in a combinatorial logic circuit 42. By way of example, a truth table for logic 42 is depicted below as Table 9.

TABLE 9

| Input Bits | | | | |
|---|---|---|---|---|
| 10 | 8 | 6 | 4 | Output Signal |
| 0 | 0 | 0 | 0 | 000000000 |
| 0 | 0 | 0 | 1 | 000000011 |
| 0 | 0 | 1 | 0 | 000001100 |
| 0 | 0 | 1 | 1 | 000001111 |
| 0 | 1 | 0 | 0 | 000110011 |
| 0 | 1 | 0 | 1 | 000110110 |
| 0 | 1 | 1 | 0 | 000111111 |
| 0 | 1 | 1 | 1 | 001000010 |
| 1 | 0 | 0 | 0 | 011001100 |
| 1 | 0 | 0 | 1 | 011001111 |
| 1 | 0 | 1 | 0 | 011011000 |
| 1 | 0 | 1 | 1 | 011011011 |
| 1 | 1 | 0 | 0 | 011111111 |
| 1 | 1 | 0 | 1 | 100000010 |
| 1 | 1 | 1 | 0 | 100001011 |
| 1 | 1 | 1 | 1 | 100001110 |

Similarly, binary quotient <5,7> and the integer portion of binary weight <9> are added in a combinatorial logic circuit 44. If desired, binary weight <3> could alternatively be aligned with binary weight <5> for output through combinatorial logic 44, (e.g., in combination with an aligning of binary weight <7> and binary weight <9>). However, since the two input adders used in the next level (described below) have a full carry in bit, bit <3> is connected via line 45 directly to the carry in of one of these adders without further complicating logic 44 or increasing the gate delay. The binary weight remainders binary R.quotients <0,1,2> and <4,5,6> can be added in a logic block 46, as can the binary R.quotient <8,9,10> and the remainder portions associated with binary weights for bit <3> and bit <7> (logic block 48).

Output from each logic block 42,44,46 & 48 is a summed binary number dependent upon the state of the inputs applied thereto. The outputs from logic 42 and from logic 44 are fed to the A input of adders 50 & 52, respectively. The B inputs to each of these adders 50 & 52 receive the outputs from remainder logic 46 & 48, respectively. These B inputs are the integer carry over remainders which are added to the integer sum. (As mentioned, adder 52 also receives the binary weight for bit <3> as a carry in bit.) The outputs from logic 46 & 48 are also fed to the inputs of a remainder adder 56 which outputs the total remainder (remainder result) and any carry over integer due to this remainder addition. The outputs from adders 50 & 52 are fed to a third circuit level which comprises a conventional two input adder 54. Adder 54 receives the output from adder 50 at its A input and the output from adder 52 at its B input. The carry over integer from remainder adder 56 is fed to the carry in input of adder 54. The total integer (integer result) is output from adder 54. (Note that the remainder is added in modulo 5 and the carry is added to the sum of the integer number, again in modulo 5.)

To summarize, the actual divide by 5 is accomplished pursuant to the present invention by recognizing initially that the arithmetic operation can be greatly simplified by working with divide by 5 weights associated with each binary digit rather than with the received binary signal. Thereafter, by aligning bits and doing wire shifts the problem is reduced to a few binary additions. The first level of logic is accomplished using truth table minimization and reduces to two logic level of NAND gate logic. These gates are all implemented in parallel. The final two levels comprise conventional combinatorial adders which make up a total of 10 logic levels of delay. This results in approximately 10-12 logical levels of delay for the divide by 5 operation. Thus, the divide by 5 function is implemented in less than today's typical clock cycle, e.g., 20-30 nanoseconds. This is significantly better than any results obtained using heretofore known hardware arrangements.

Those skilled in the art will recognize from the above description that a novel fast hardware divide by 5 technique for converting given address data is presented. The technique beneficially allows a raster engine to complete an X,Y division operation within a single clock cycle using today's fast operating frequencies, e.g., 30 MHz. The technique is flexible and allows for division of a binary signal by any non-binary power, integer number. Thus, as new systems evolve, the techniques presented herein will continue to apply.

While the invention has been described in detail herein in accordance with certain preferred embodiments thereof, many modifications and changes therein may be affected by those skilled in the art. Accordingly, it is intended by the appended claims to cover all such modifications and changes as fall within the true spirit and scope of the invention.

I claim:

1. A hardware divider for a raster engine of a graphics display system, said raster engine having a given binary signal of a plurality of bits, said hardware divider for dividing said given binary signal by a predetermined integer number of a non-binary power, each of said plurality of bits having a binary power of known weight, said hardware divider comprising:

means for converting each '1' bit of said given binary signal into a binary weight signal, each binary weight signal comprising a binary representation of the binary power of known weight for said '1' bit divided by said integer number, and each binary weight signal having an integer portion and a remainder portion; and means for summing each of said binary weight signals corresponding to said '1' bit of said given binary signal to derive a resultant binary signal having both an integer portion and a remainder portion, said resultant binary signal being a binary representation of said given binary signal divided by said predetermined integer number.

2. The hardware divider of claim 1, wherein said summing means includes multiple, two input combinatorial adders.

3. The hardware divider of claim 1, wherein said predetermined integer number comprises the number 5.

4. The hardware divider of claim 3, wherein said summing means separately sums said integer portions of said binary weight signals and said remainder portions of said binary weight signals in modulo 5, and wherein said summing means includes means for carrying over any integer number resulting from said summing of remainder portions to said summing of integer portions.

5. The hardware divider of claim 1, wherein associated with said raster engine is a frame buffer having multiple modules, and wherein said resultant binary signal comprises an address location, said remainder portion of said resultant binary signal identifying a specific one of said multiple frame buffer modules, said integer portion of said resultant binary signal identifying a column address within said identified frame buffer module.

6. The hardware divider of claim 1, wherein said summing means includes means for obtaining said resultant binary signal within a single clock cycle of the raster engine.

7. The hardware divider of claim 1, wherein said combinatorial logic receives preselected pairs of said bits comprising said given binary signal, said bits of each preselected pair having mutually exclusive binary weight signals when said paired bits both comprise a '1' bit.

8. A hardware circuit for adding predetermined binary quotients associated with preselected digits of a given binary signal, each digit of said binary signal having a predetermined binary quotient associated therewith when having an active '1' value, said hardware circuit comprising:

a wire shifting circuit wherein binary quotients associated with preselected pairs of said bits comprising said given binary signal are combined by wiring alone, each digit of a combined pairing of bits defining a mutually exclusive binary quotient when said paired digits both have an active '1' value; and summing means associated with said wire shifting circuit for adding the combined binary quotients of the preselected bit pairs, whereby said wire shifting circuit adds the binary quotients of said preselected bit pairs without delay.

* * * * *

UNITED STATES PATENT AND TRADEMARK OFFICE
CERTIFICATE OF CORRECTION

PATENT NO.  : 5,315,540
DATED       : May 24, 1994
INVENTOR(S) : Lawless, William It is certified that error appears in the above-indentified patent and that said Letters Patent is hereby corrected as shown below:

Column 3, line 33, between "to" and "aspect" insert --an--.

Column 4, line 50, delete "(Modulo 5)" and insert therefor --(modulo 5)--.

Column 4, line 53, delete "Modulo 5" and insert therefor --modulo 5--.

Column 7, between lines 31 & 32, insert -- + Binary R.Weight <7> --.

Signed and Sealed this

Thirteenth Day of September, 1994

Attest:

BRUCE LEHMAN

*Attesting Officer*      *Commissioner of Patents and Trademarks*